(12) United States Patent
Kim et al.

(10) Patent No.: US 10,107,209 B2
(45) Date of Patent: Oct. 23, 2018

(54) ENGINE

(71) Applicant: Doosan Infracore Co., Ltd., Incheon (KR)

(72) Inventors: Kwang-Soo Kim, Incheon (KR); Ja-Yun Cho, Gyeonggi-do (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 15/128,013

(22) PCT Filed: Mar. 25, 2015

(86) PCT No.: PCT/KR2015/002938
§ 371 (c)(1),
(2) Date: Sep. 21, 2016

(87) PCT Pub. No.: WO2015/147554
PCT Pub. Date: Oct. 1, 2015

(65) Prior Publication Data
US 2017/0096948 A1     Apr. 6, 2017

(30) Foreign Application Priority Data
Mar. 25, 2014   (KR) ........................ 10-2014-0034370

(51) Int. Cl.
*F02D 13/02*     (2006.01)
*F02B 43/04*     (2006.01)
(Continued)

(52) U.S. Cl.
CPC .......... *F02D 13/0261* (2013.01); *F01L 1/047* (2013.01); *F02B 43/04* (2013.01);
(Continued)

(58) Field of Classification Search
CPC .......... F02D 13/0261; F02D 2041/001; F02D 13/0219; F02D 13/0207; F02D 13/0238;
(Continued)

(56) References Cited

U.S. PATENT DOCUMENTS 4,703,734 A   11/1987   Aoyama et al.
5,161,497 A   11/1992   Simko et al.
(Continued)

FOREIGN PATENT DOCUMENTS

DE   10-2007-028513    12/2008
JP   2011-185145 A    9/2011
(Continued)

OTHER PUBLICATIONS

International Search Report (with English translation) issued in international application No. PCT/KR2015/002938, dated Jun. 25, 2015, 5 pages.
(Continued)

*Primary Examiner* — Long T Tran
(74) *Attorney, Agent, or Firm* — K&L Gates LLP (57) ABSTRACT

An engine having improved volumetric efficiency may include a cylinder, an intake valve, a piston, an exhaust valve and a crankshaft. The cylinder may include a cylinder bore. The intake valve may be configured to introduce a fuel and an air into the cylinder bore. The piston may be slidably arranged in the cylinder bore. The piston may be configured to convert an explosive power of an exhaust gas, which may be generated by combusting the fuel, into a linear driving force. The exhaust valve may be configured to exhaust the exhaust gas from the cylinder bore. The crankshaft may be connected with the piston to convert the linear driving force into a rotary driving force. The intake valve and the exhaust valve may be simultaneously opened within a rotation angle of about 3° to about 12° of the crankshaft.

13 Claims, 8 Drawing Sheets

(51) Int. Cl.
*F02M 21/02* (2006.01)
*F01L 1/047* (2006.01)

(52) U.S. Cl.
CPC ..... *F02D 13/0249* (2013.01); *F02M 21/0215* (2013.01); *Y02T 10/18* (2013.01); *Y02T 10/32* (2013.01)

(58) Field of Classification Search
CPC ............ F02D 13/0211; F02D 13/0226; F02D 13/0246
See application file for complete search history.

(56) References Cited

U.S. PATENT DOCUMENTS

| | | | |
|---|---|---|---|
| 5,357,936 A | 10/1994 | Hitomo et al. | |
| 6,125,801 A | 10/2000 | Mendler | |
| 6,244,229 B1 * | 6/2001 | Nakano | F01L 1/0532 123/90.15 |
| 7,171,943 B1 * | 2/2007 | Wada | F01L 1/34 123/348 |
| 7,178,493 B2 * | 2/2007 | Kang | F02D 13/0253 123/90.15 |
| 7,325,521 B1 * | 2/2008 | Leiby | F01L 1/34 123/90.15 |
| 7,415,966 B2 | 8/2008 | Irisawa | |
| 7,472,685 B2 * | 1/2009 | Tanabe | F01L 1/022 123/399 |
| 7,669,563 B2 * | 3/2010 | Fujii | F01L 1/3442 123/347 |
| 7,707,988 B2 | 5/2010 | Irisawa | |
| 2004/0011311 A1 * | 1/2004 | Takahashi | F01L 1/34 123/90.15 |
| 2005/0005908 A1 | 1/2005 | Tanei et al. | |
| 2006/0266311 A1 * | 11/2006 | Fujii | F01L 1/3442 123/90.15 |
| 2007/0006832 A1 * | 1/2007 | Kang | F02D 13/0253 123/90.15 |
| 2008/0035084 A1 * | 2/2008 | Leiby | F01L 1/34 123/90.16 |
| 2009/0107431 A1 * | 4/2009 | Ezaki | F01L 1/02 123/90.16 |
| 2010/0185381 A1 | 7/2010 | VanDyne et al. | |
| 2010/0305834 A1 | 12/2010 | Ito et al. | |
| 2011/0315101 A1 | 12/2011 | Cleary et al. | |
| 2013/0104544 A1 * | 5/2013 | Schilling | F02B 17/005 60/605.2 |
| 2013/0174816 A1 * | 7/2013 | Riley | F02B 47/08 123/568.11 |
| 2014/0238323 A1 * | 8/2014 | Kashiwabara | F01L 1/047 123/90.15 |

FOREIGN PATENT DOCUMENTS

| | | |
|---|---|---|
| KR | 10-2007-0003624 A | 1/2007 |
| KR | 10-2007-0090244 A | 9/2007 |

OTHER PUBLICATIONS

Written Opinion issued in international application No. PCT/KR2015/002938, dated Jun. 25, 2015, 8 pages.
Extended European Search Report issued in related European Patent Application No. 15768428.3 dated Jul. 11, 2017.

* cited by examiner

ENGINE

CROSS REFERENCE TO RELATED APPLICATIONS

The present application is a National Stage of International Application No. PCT/KR2015/002938, filed on Mar. 25, 2015, which claims priority to Korean Patent Application No. 10-2014-0034370, filed on Mar. 25, 2014, the entire contents of each of which are being incorporated herein by reference.

BACKGROUND

1. Field

Example embodiments relate to an engine. More particularly, example embodiments relate to a compressed natural gas (CNG) engine.

2. Description of the Related Art

Most of engines may have an overlap at which an intake valve and an exhaust valve may be simultaneously opened. Generally, the intake valve may be opened before a top dead point of a piston and closed after a bottom dead point of the piston. The exhaust valve may be opened before the top dead point and closed after the top dead point.

Particularly, when the intake valve may be so quickly closed, an amount of an intake air may be decreased to reduce a volumetric efficiency. In contrast, the intake valve may be closed lately, a mixture in a cylinder may flow backwardly toward an intake port to reduce the volumetric efficiency. Further, when the exhaust valve may be so quickly closed, an exhaust gas may not be sufficiently exhausted. In contrast, the exhaust valve may be closed late, the exhaust gas may flow backwardly from an exhaust port to the cylinder to reduce the volumetric efficiency. The mixture, which may not be combusted in the cylinder, may be exhausted through the exhaust port into decrease fuel efficiency, thereby causing fail of compliance with emission regulations with respect to a $CH_4$ gas.

In a compressed natural gas (CNG) engine, a fuel and an air may be mixed from an intake port to form a mixture. The mixture may be introduced into a cylinder. Therefore, a performance of the CNG engine may be dependent upon opening times and closing times of an intake valve and an exhaust valve.

SUMMARY

Example embodiments provide an engine that may be capable of reducing a slip of a $CH_4$ gas and improving a volumetric efficiency.

According to example embodiments, there may be provided an engine. The engine may include a cylinder, an intake valve, a piston, an exhaust valve and a crankshaft. The cylinder may include a cylinder bore. The intake valve may be configured to introduce a fuel and an air into the cylinder bore. The piston may be slidably arranged in the cylinder bore. The piston may be configured to convert an explosive power of an exhaust gas, which may be generated by combusting the fuel, into a linear driving force. The exhaust valve may be configured to exhaust the exhaust gas from the cylinder bore. The crankshaft may be connected with the piston to convert the linear driving force into a rotary driving force. The intake valve and the exhaust valve may be simultaneously opened within a rotation angle of about 3° to about 12° of the crankshaft.

In example embodiments, the intake valve and the exhaust valve may be simultaneously opened within a rotation angle of about 3° to about 6° of the crankshaft.

In example embodiments, the intake valve may be opened within a rotation angle of about 1° to about 2° of the crankshaft before a top dead point of the piston.

In example embodiments, the exhaust valve may be opened within a rotation angle of about 2° to about 10° of the crankshaft after the top dead point of the piston.

In example embodiments, a section after the top dead point of the piston in a total section where the intake valve and the exhaust valve may be simultaneously opened may be wider than a section before the top dead point of the piston.

In example embodiments, the engine may further include a camshaft connected with the crankshaft to operate the intake valve and the exhaust valve.

In example embodiments, the intake valve and the exhaust valve may be simultaneously opened within a rotation angle of about 1.5° to about 3° of the crankshaft.

In example embodiments, the engine may include a CNG engine.

In example embodiments, the engine may further include a fuel supply system configured to supply a compressed natural gas to the cylinder.

According to example embodiments, there may be provided an engine. The engine may include a cylinder, an intake valve, an exhaust valve, a camshaft, an intake cam and an exhaust cam. The cylinder may include a cylinder bore. The intake valve may be configured to introduce a fuel and an air into the cylinder bore. The exhaust valve may be configured to exhaust an exhaust gas from the cylinder bore. The camshaft may be configured to operate the intake valve and the exhaust valve. The intake cam may be combined with the camshaft to open/close the intake valve. The exhaust cam may be combined with the camshaft to open/close the exhaust valve. A closing angle of the intake cam may be about 65° to about 69°. An opening angle of the exhaust cam may be about 73° to about 77°.

In example embodiments, the opening angle of the exhaust cam may be measured from a center point of a nose to an end of a lob in the exhaust cam. The closing angle of the intake cam may be measured from a center point of a nose to an end of a lob in the intake cam.

In example embodiments, a phase difference between the noses in the intake cam and the exhaust cam may be about 107.75° to about 112.25°.

In example embodiments, the phase difference between the noses in the intake cam and the exhaust cam may be obtained by measuring an angle difference between the noses in the intake cam and the exhaust cam with respect to a rotational direction of the camshaft.

In example embodiments, the intake cam and the exhaust cam may be provided to the same cam shaft. Alternatively, the intake cam and the exhaust cam may be provided to different camshafts having substantially revolutions per minute (RPM).

According to example embodiments, an overlap, which may mean the period during the valve timing where bot of the intake and exhaust valves may be opened, may be controlled to maintain a volumetric efficiency of the engine and improve a fuel efficiency of the engine. Further, a slip, which may mean a direct discharge of the non-combusted fuel to an exhaust port, may be reduced by decreasing an overlap angle. Therefore, the engine may satisfy emission regulations with respect to a $CH_4$ gas.

BRIEF DESCRIPTION OF THE DRAWINGS

Example embodiments will be more clearly understood from the following detailed description taken in conjunction with the accompanying drawings. FIGS. 1 to 8 represent non-limiting, example embodiments as described herein.

DETAILED DESCRIPTION OF THE EMBODIMENTS

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
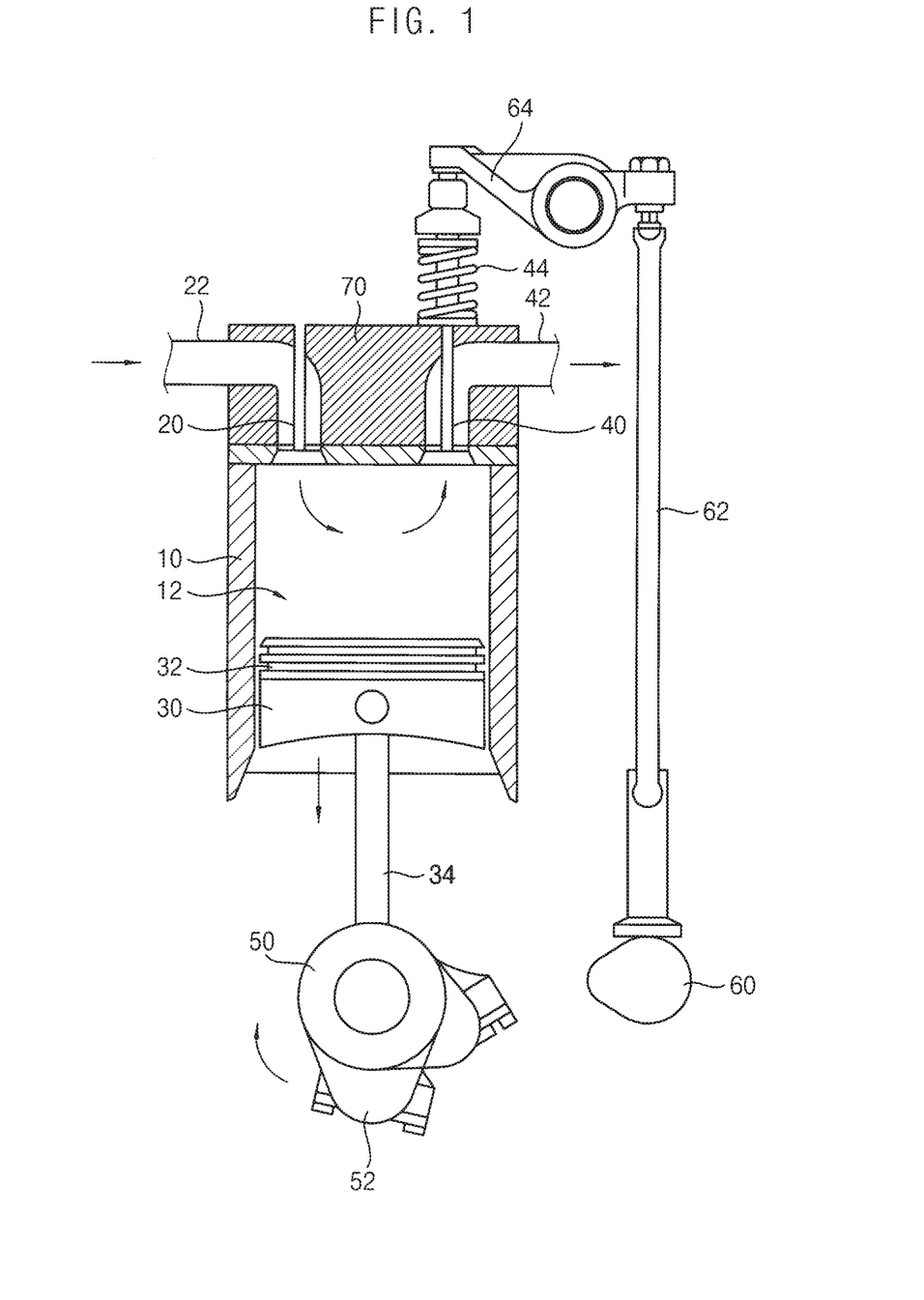
FIG. 1 is a cross-sectional view illustrating an engine in accordance with example embodiments.
Figure 2:
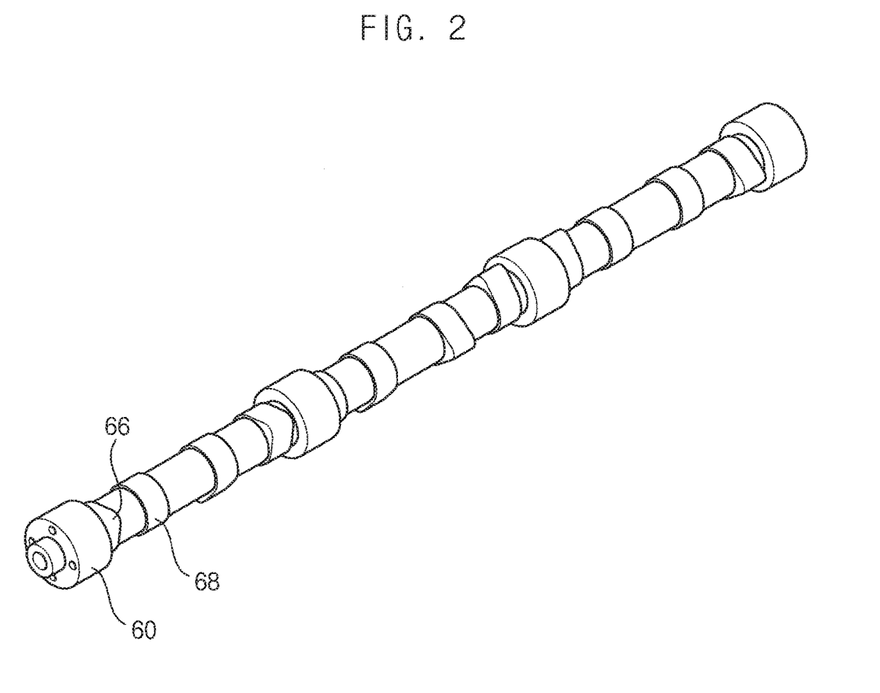
FIG. 2 is a perspective view illustrating a crankshaft in FIG. 1.
Figure 3:
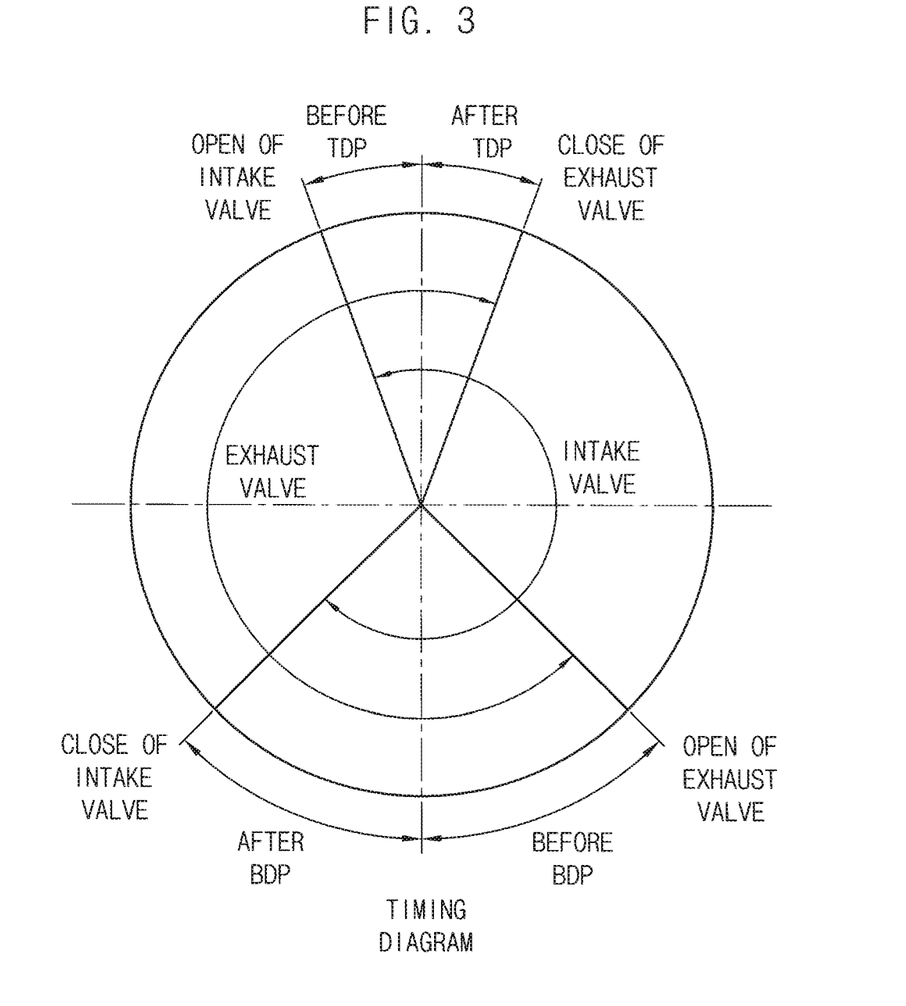
FIGS. 3 and 4 are graphs chart showing operations of the crankshaft in FIG. 1.
Figure 4:
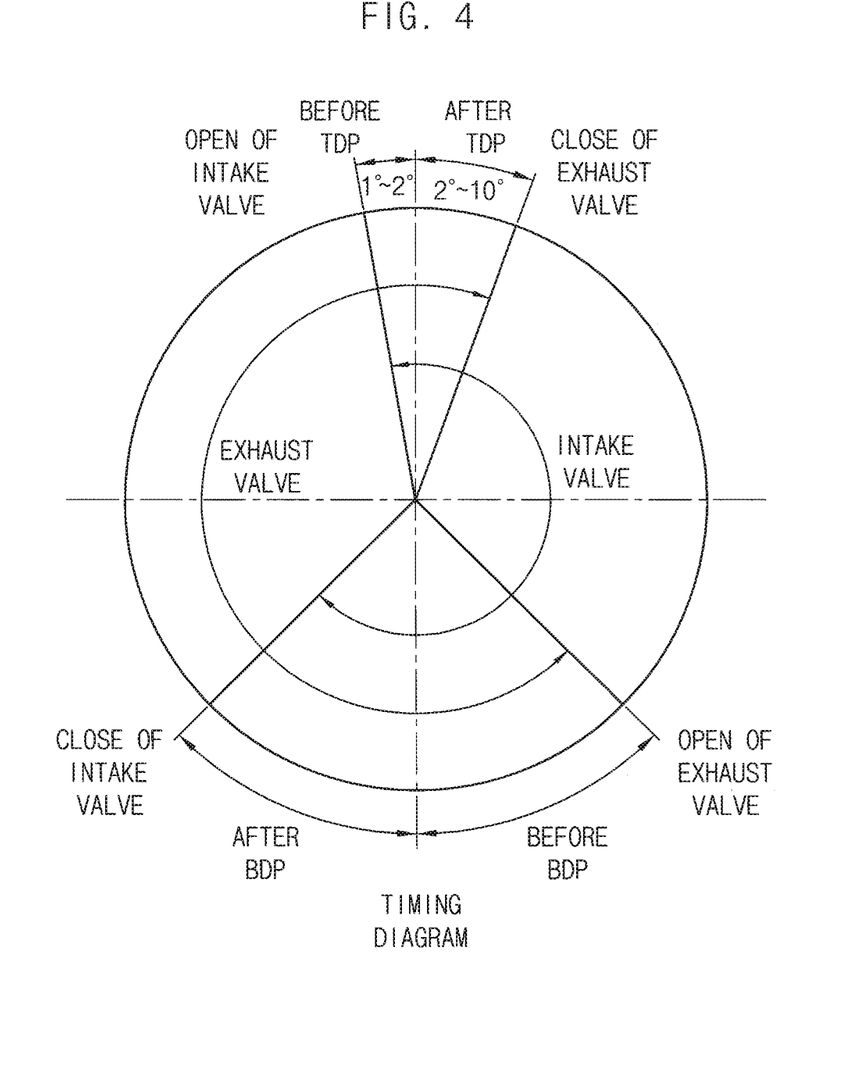
Figure 5:
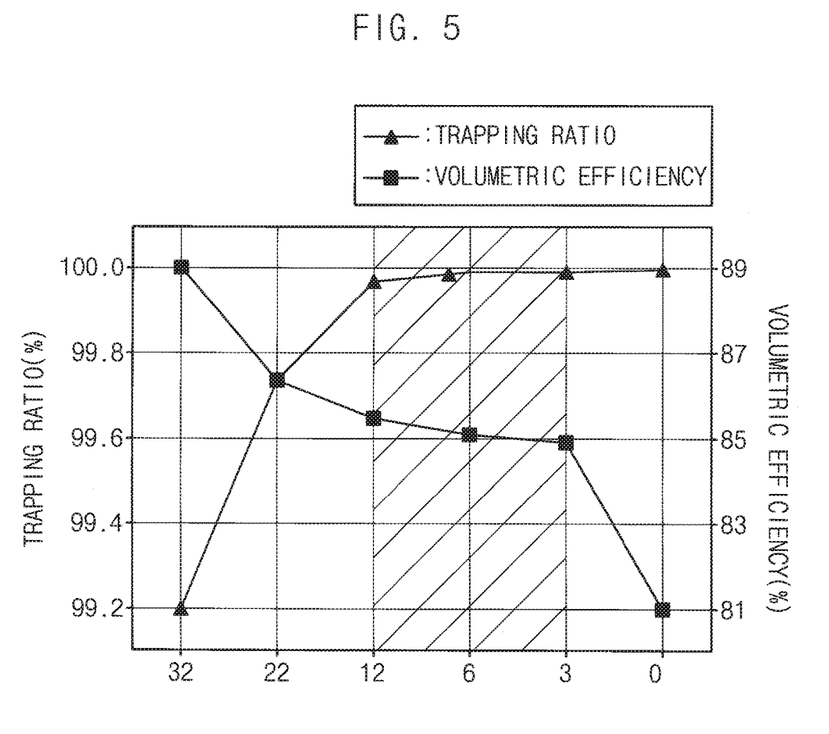
FIG. 5 is a graph showing performances of the engine with respect to overlap angles in FIG. 1.
Figure 6:
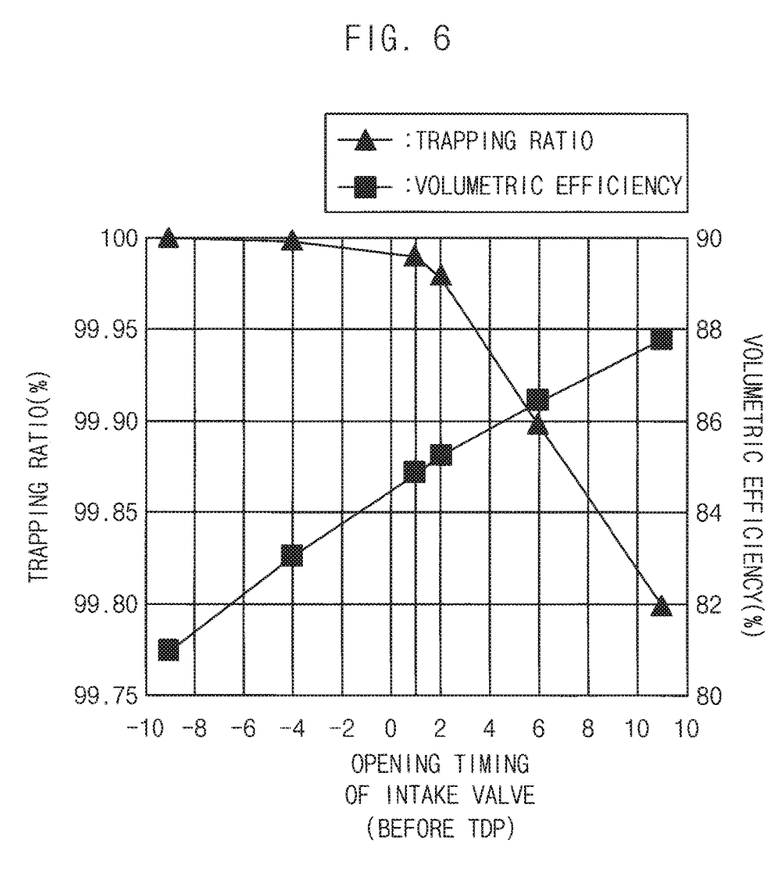
FIG. 6 is a graph showing performances of the engine with respect to an opening timing of an intake valve in the engine of FIG. 1.
Figure 7:
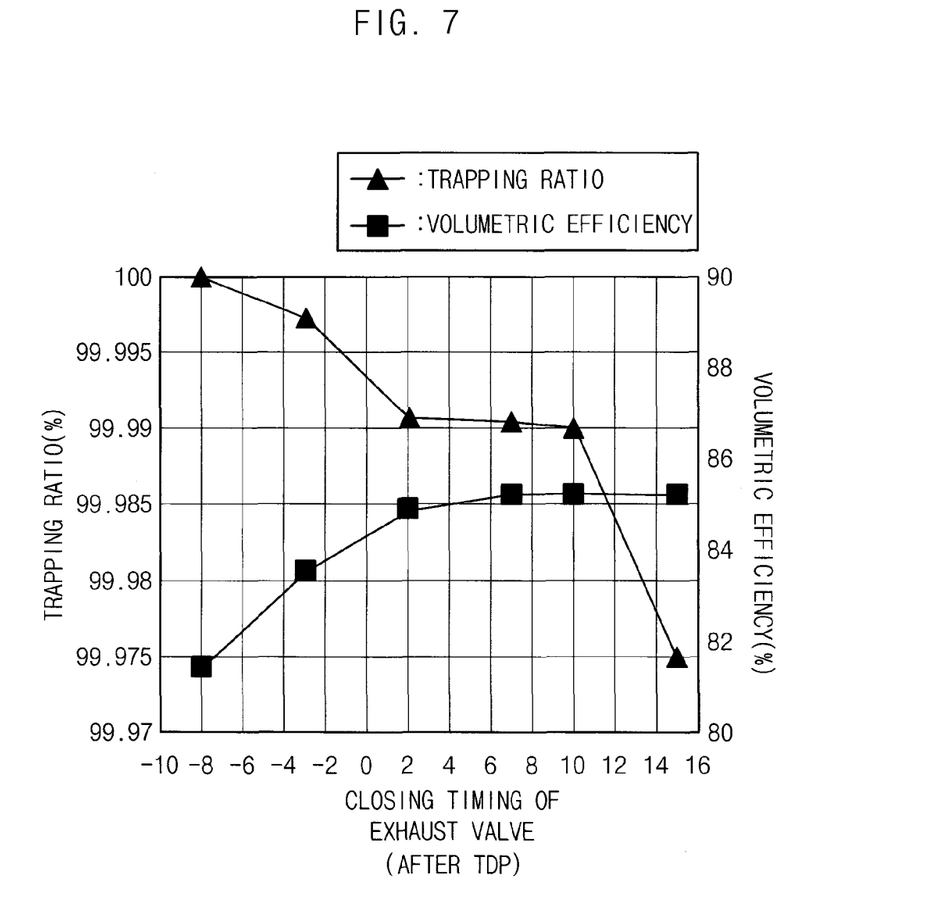
FIG. 7 is a graph showing performances of the engine with respect to a closing timing of an exhaust valve in the engine of FIG. 1.
Figure 8:
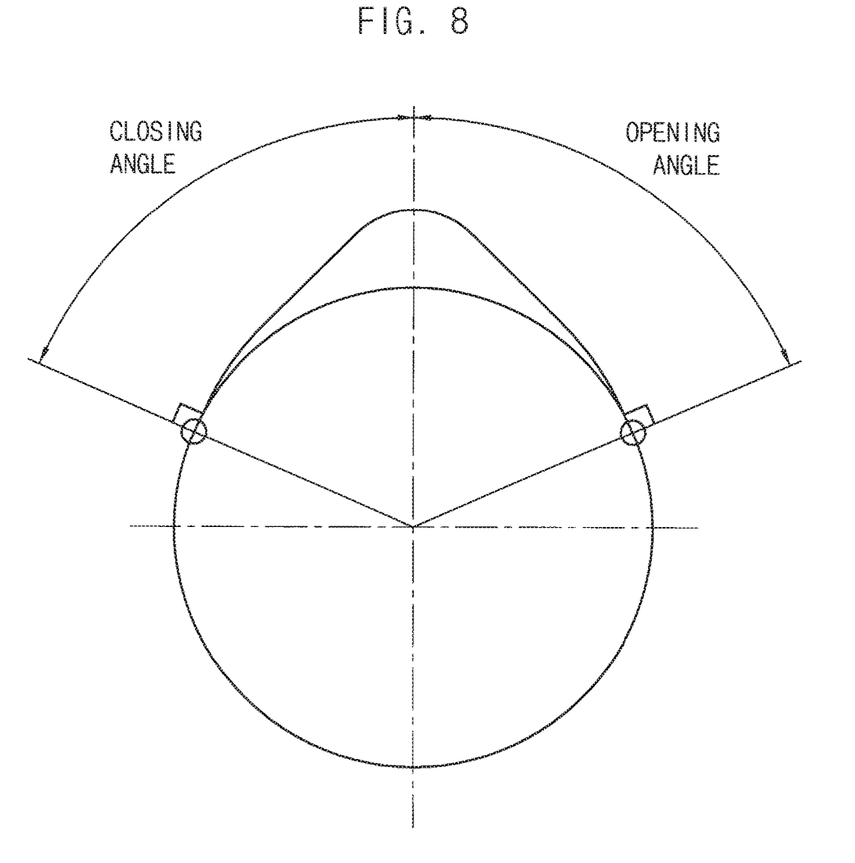
FIG. 8 is a graph showing a closing angle of an intake cam and an opening angle of an exhaust cam in FIG. 1.

FIG. 1 is a cross-sectional view illustrating an engine in accordance with example embodiments, FIG. 2 is a perspective view illustrating a crankshaft in FIG. 1, FIGS. 3 and 4 are graphs chart showing operations of the crankshaft in FIG. 1, FIG. 5 is a graph showing performances of the engine with respect to overlap angles in FIG. 1, FIG. 6 is a graph showing performances of the engine with respect to an opening timing of an intake valve in the engine of FIG. 1, FIG. 7 is a graph showing performances of the engine with respect to a closing timing of an exhaust valve in the engine of FIG. 1, and FIG. 8 is a graph showing a closing angle of an intake cam and an opening angle of an exhaust cam in FIG. 1.

Referring to FIGS. 1 to 8, an engine may include a cylinder 10, an intake valve 20, a piston 30, an exhaust valve 40 and a crankshaft 50. The cylinder 10 may have a cylinder bore 12. The intake valve 20 may be configured to introduce an air and a fuel into the cylinder bore 12. The piston 30 may be slidably arranged in the cylinder bore 12. The exhaust valve 40 may be configured to discharge an exhaust gas generated in the cylinder bore 12. The crankshaft 50 may be connected with the piston 30.

The cylinder 10 may be configured to move the piston 30 using an explosive power generated from the fuel and the air in the cylinder bore 12. Numbers of the cylinder 10 may be determined in accordance with a desired power. The cylinder 10 may have heat resistance and corrosion resistance. Thus, the cylinder 10 may include a special cast iron, an aluminum alloy, etc. The cylinder 10 may have an inner surface to which a special treatment may be performed to prevent the cylinder 10 from being worn.

The intake valve 20 may introduce the air and the fuel into the cylinder bore 12 through an intake port 22 during an intake stroke of the engine.

The intake valve 20 may be opened and closed by a locker arm 64 arranged over the intake valve 20. A valve spring 44 may function as to close the intake valve 20 at an end of the intake stroke and also maintain the closed state of the intake valve 20.

The piston 30 may be slidably arranged in the cylinder bore 12. The piston 30 may be configured to convert the explosive force of the exhaust gas, which may be generated by combusting the fuel, into a linear driving force. The piston 30 may be reciprocally moved in the cylinder bore 12 to compress the air and the fuel in the cylinder bore 12. The piston 30 may transmit an expansion power generated by combusting the air and the fuel to a connecting rod 34.

The piston 30 may include piston rings 32 on an outer surface of the piston 30. The piston rings 32 may function as to seal between the cylinder 10 and the piston 30 and scrap oils on the inner surface of the cylinder 10.

The exhaust valve 40 may discharge the exhaust gas generated during an exhaust stroke of the engine. The exhaust valve 40 may be opened and closed by the locker arm 64 arranged over the exhaust valve 40. The valve spring 44 may function as to close the exhaust valve 40 at an end of the exhaust stroke and also maintain the closed state of the exhaust valve 40.

The crankshaft 50 may be connected with the piston 30 via the connecting rod 34. The crankshaft 50 may convert the linear driving force by the piston 30 into a rotary driving force.

The crankshaft 50 may include a balance weight 52. The linear driving force may be transmitted from the piston 30 to the crankshaft 50 during an explosion stroke of the engine so that the crankshaft 50 may be rotated. A force in a direction opposite to a rotation direction of the crankshaft 50 may be applied to the crankshaft 50 during the intake stroke, a compression stroke and the exhaust stroke of the engine. The balance weight 52 may generate a rotational inertia to suppress the force applied to the crankshaft 50. That is, the balance weight 52 may suppress imbalance of inertia or a torque generated in the intake stroke, the compression stroke, the explosion stroke and the exhaust stroke.

In example embodiments, the engine may further include a camshaft 60. The camshaft 60 may be mechanically connected with the crankshaft 50 to operate the intake valve 20 and the exhaust valve 40. The camshaft 60 may be interlocked with the crankshaft 50 by a gear train to receive the rotational driving force from the crankshaft 50.

The camshaft 60 may include an intake cam 66 and an exhaust cam 68. The intake cam 66 may be configured to operate the intake valve 20. The exhaust cam 68 may be configured to operate the exhaust valve 40. The intake cam 66 and the exhaust cam 68 may make contact with a push rod 62 to move upwardly and downwardly the push rod 62. Thus, the push rod 62 may be reciprocally moved by the rotation of the camshaft 60. The intake cam 66 and the exhaust cam 68 may include noses having a protruded shape to move upwardly and downwardly the push rod 62.

The linear reciprocal movement of the push rod 62 may rotate the locker arm 64 making contact with the push rod 62. The locker arm 64 may be rotated to open or close the intake valve 20 or the exhaust valve 40 connected with the locker arm 64.

In example embodiments, the intake valve 20 and the exhaust valve 40 may be simultaneously opened (overlapped) within a rotation angle of about 3° to about 12° of the crankshaft 50.

Referring to FIG. 5, when the engine may be rotated at a speed of about 1,000 RPM, a trapping ratio of the engine with respect to an overlap angle may be as follows. The trapping ratio may be a ratio of a mass of the air and the fuel in the cylinder bore 12 with respect to a mass of the air and the fuel introduced through the intake valve 20.

The trapping ratio may be increased in proportion to a decrease of the overlap angle. That is, because a simultaneous open time of the intake valve 20 and the exhaust valve 40 may be decreased, a slip, which may mean a discharge of the air and the fuel without combustion through the exhaust valve 40.

When the engine may be rotated at a speed of about 1,000 RPM, a volumetric efficiency of the engine with respect to the overlap angle may be as follows. The volumetric efficiency may be a ratio of a mass of an actual air and an actual fuel in the cylinder bore 12 with respect to a mass of an inhalable air and an inhalable fuel into the cylinder bore 12 by one cycle of the engine.

Referring to FIG. 4, the volumetric efficiency may be decreased in proportion to a decreased of the overlap angle. The decrease of the volumetric efficiency may result in an insufficient inflow of the air and the fuel so that the performance of the engine may be deteriorated. A gas inertia effect of the air and the fuel may not be used.

In example embodiments, the intake valve 20 and the exhaust valve 40 may be simultaneously opened within a rotation angle of about 3° to about 6° of the crankshaft 50.

In example embodiments, the intake valve 20 may be opened within a rotation angle of about 1° to about 2° of the crankshaft 50 before the top dead point of the piston 30. The exhaust valve 40 may be opened within a rotation angle of about 2° to about 10° of the crankshaft 50 after the top dead point of the piston 30.

Referring to FIG. 6, when an opening timing of the intake valve 20 may be advanced by about 2° of crankshaft before the top dead point of the piston 30, the volumetric efficiency may be increased, but the trapping ratio may be remarkably decreased. Further, when an opening timing of the intake valve 20 may be late by about 1° of crankshaft before the top dead point of the piston 30, the trapping ratio may be slightly increased, but the volumetric efficiency may be remarkably decreased. Thus, the intake valve 20 may be opened within a rotation angle of about 1° to about 2° of the crankshaft 50 before the top dead point.

Referring to FIG. 7, when a closing timing of the exhaust valve 40 may be advanced by about 2° of crankshaft after the top dead point of the piston 30, the volumetric efficiency may be remarkably decreased. Further, when a closing timing of the exhaust valve 40 may be late by about 10° of crankshaft after the top dead point of the piston 30, the trapping ratio may be remarkably decreased. Thus, the exhaust valve 40 may be opened within a rotation angle of about 2° to about 10° of the crankshaft 50 after the top dead point.

A rotation angle of the camshaft 60 may be controlled in accordance with the rotation angle of the crankshaft 50. In example embodiments, the intake valve 20 and the exhaust valve 40 may be simultaneously opened within a rotation angle of about 1.5° to about 3° of the camshaft 60.

Referring to FIG. 8, a closing angle of the intake cam 66 may be about 65° to about 69°. An opening angle of the exhaust cam 68 may be about 73° to about 77°.

The opening angle of the exhaust cam 68 may be measured from a center point of the nose to an end of a lob in the exhaust cam 68. The closing angle of the intake cam 66 may be measured from a center point of the nose to an end of a lob in the intake cam 66.

A phase difference between the noses of the intake cam 66 and the exhaust cam 68 may be about 107.75° to about 112.25°. The phase difference may be determined in accordance with an RPM of the camshaft 60 of two times that of the crankshaft 50.

A phase difference between the noses of the intake cam 66 and the exhaust cam 68 may be obtained by measuring an angle difference between the noses of the intake cam 66 and the exhaust cam 68.

In example embodiments, the intake cam 66 and the exhaust cam 68 may be provided to the single camshaft 60. Alternatively, the intake cam 66 and the exhaust cam 68 may be provided to different camshafts having a substantially same RPM.

When the phase difference between the noses of the intake cam 66 and the exhaust cam 68 may be below about 107.75°, the trapping ratio may be remarkably decreased because the overlap section may be increased.

In contrast, when the phase difference between the noses of the intake cam 66 and the exhaust cam 68 may be above about 112.25°, the volumetric efficiency may be remarkably decreased because the overlap section may be decreased.

In example embodiments, the engine may include a compressed natural gas (CNG) engine. The engine may further include a fuel supply system configured to supply the compressed natural gas to the cylinder 10. The fuel supply system may supply a compressed fuel gas having a low temperature in a gas tank to the CNG engine.

In example embodiments, the fuel supply system may include a tank configured to receive a compressed fuel gas, a gas regulator, a heat exchanger and a fuel metering valve. The gas regulator, the heat exchanger and the fuel metering valve may be sequentially connected to the tank.

In example embodiments, the engine may include the crankshaft 50 having the overlap angle of about 3° to about 12°. When the overlap angle may be between about 3° to about 12°, the engine may have a maximum performance.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An engine comprising:
a cylinder having a cylinder bore;
an intake valve configured to introduce an air and a fuel into the cylinder bore;
a piston slidably arranged in the cylinder bore to convert an explosive force, which is generated by combusting the fuel, into a linear driving force;
an exhaust valve configured to exhaust an exhaust gas from the cylinder bore; and
a crankshaft connected with the piston to convert the linear driving force into a rotational driving force,
wherein the intake valve and the exhaust valve are simultaneously opened within a rotation angle of 3° to 12° of the crankshaft, the intake valve is opened within the rotation angle of 1° to 2° of the crankshaft before a top dead point of the piston, and the exhaust valve is closed within the rotation angle of 2° to 10° of the crankshaft after a top dead point of the piston.

2. The engine of claim 1, wherein the intake valve and the exhaust valve are simultaneously opened within the rotation angle of 3° to 6° of the crankshaft.

3. The engine of claim 1, wherein a section after a top dead point of the piston in a total section in which the intake valve and the exhaust valve are simultaneously opened is wider than a section before the top dead point of the piston in the total section in which the intake valve and the exhaust valve are simultaneously opened.

4. The engine of claim 1, further comprising a camshaft connected with the crankshaft to operate the intake valve and the exhaust valve.

5. The engine of claim 4, wherein the intake valve and the exhaust valve are simultaneously opened within a rotation angle of 1.5° to 3° of the camshaft.

6. The engine of claim 5, further comprising:
an intake cam combined with the camshaft to open and close the intake valve; and
an exhaust cam combined with the camshaft to open and close the exhaust valve,
wherein a phase difference between a nose of the intake cam in the intake valve and a nose of the exhaust cam in the exhaust valve is 107.75° to 112.25°.

7. The engine of claim 6, wherein a closing angle of the intake cam is 65° to 69°, and an opening angle of the exhaust cam is 73° to 77°.

8. The engine of claim 1, wherein the engine comprises a compressed natural gas (CNG) engine.

9. The engine of claim 8, further comprising a fuel supply system configured to supply CNG to the cylinder.

10. An engine comprising:
a cylinder having a cylinder bore;
an intake valve configured to introduce an air and a fuel into the cylinder bore;
an exhaust valve configured to exhaust an exhaust gas from the cylinder bore;
a camshaft configured to operate the intake valve and the exhaust valve;
an intake cam combined with the camshaft to open and close the intake valve; and
an exhaust cam combined with the camshaft to open and close the exhaust valve,
wherein a phase difference between a nose of the intake cam and a nose of the exhaust cam is 107.75° to 112.25°.

11. The engine of claim 10, wherein the intake valve and the exhaust valve are simultaneously opened within the rotation angle of 1.5° to 3° of the camshaft.

12. The engine of claim 10, wherein a closing angle of the intake cam is narrower than an opening angle of the exhaust cam.

13. The engine of claim 12, wherein the closing angle of the intake cam is 65° to 69°, and the opening angle of the exhaust cam is 73° to 77°.

\* \* \* \* \*